(12) United States Patent
Otto et al.

(10) Patent No.: US 7,112,618 B2
(45) Date of Patent: Sep. 26, 2006

(54) BEADED BLACK

(75) Inventors: Karin Otto, Fairlawn, OH (US); Heinz Zoch, Maintal (DE); Jan Kopietz, Fröndenberg (DE)

(73) Assignee: Degussa AG, Düsseldorf (DE)

( * ) Notice: Subject to any disclaimer, the term of this patent is extended or adjusted under 35 U.S.C. 154(b) by 701 days.

(21) Appl. No.: 10/014,810

(22) Filed: Dec. 14, 2001

(65) Prior Publication Data

US 2002/0112646 A1    Aug. 22, 2002

(30) Foreign Application Priority Data

Dec. 16, 2000    (DE)    ................. 100 62 942

(51) Int. Cl.
*C08K 3/04*    (2006.01)

(52) U.S. Cl. ................. 523/161; 523/160; 524/495

(58) Field of Classification Search ................. 523/160, 523/161; 524/495
See application file for complete search history.

(56) References Cited

U.S. PATENT DOCUMENTS 4,162,997 A * 7/1979 Walsh ................. 524/272
5,797,988 A * 8/1998 Linde et al. ................. 106/472
6,803,026 B1 * 10/2004 Linde et al. ................. 423/449.2

FOREIGN PATENT DOCUMENTS

| DE | 196 23 198 | 12/1997 |
|---|---|---|
| EP | 0 924 268 | 6/1999 |
| WO | WO 96 01875 | 1/1996 |

OTHER PUBLICATIONS

Copy of European Search Report for counterpart application No. EP 01 12 8693 dated Apr. 4, 2002.

* cited by examiner

*Primary Examiner*—Edward J. Cain
(74) *Attorney, Agent, or Firm*—Smith, Gambrell & Russell, LLP

(57) ABSTRACT

A beaded black containing at least one pelletizing additive and at least one synthetic oil. The beaded black can be produced in a pelletizing machine and used as a filler and/or pigment in rubber and plastic articles and as a pigment for the production of printing inks.

27 Claims, 2 Drawing Sheets

BEADED BLACK

INTRODUCTION AND BACKGROUND

The present invention relates to a beaded black, a process for its production and its use.

In the processing of industrial carbon blacks, pelletized products, commonly known as beaded black, are preferably used. Two different methods are used for pelletizing carbon blacks on an industrial scale: wet pelletizing in a pelletizing machine with subsequent drying, and dry pelletizing in a pelletizing drum. The two methods have markedly different process parameters, which are closely linked to the physical processes involved in agglomeration in each case and to the resulting bead properties (Ullmanns Encyklopädie der technischen Chemie, 4th Edition, Volume 14, page 639–640 (1977)).

A beaded black is known from EP 0 924 268 which contains at least one natural and/or synthetic wax and which is obtained by pelletizing a powdered starting black, whereby the content of waxes in the beaded black is 1 to less than 10 wt. %, relative to the total weight of beaded black, and the hardness of the individual beads in the beaded black is greater than 0.15 N.

The disadvantage of the known beaded blacks is their poor dispersibility at the specified bead hardness.

It is therefore an object of the present invention to produce a beaded black having improved dispersibility, abrasion resistance, flow behaviour and transport stability.

SUMMARY OF THE INVENTION

The above and other objects of the invention can be achieved by a beaded black which contains at least one pelletizing additive and at least one synthetic oil. The pelletizing additive content can be 0.1 to less than 10 wt. %, preferably 1 to 5 wt. %, and the oil content 1 to 12 wt. %, preferably 4 to 8 wt. %, relative to its total weight. The hardness of the individual beads in the 0.5 mm–0.71 mm bead fraction can be greater than 2 g.

The pelletizing additive can be oil-soluble. The pelletizing additives used to produce the carbon black can be both natural and synthetic waxes. A good overview of suitable waxes according to the invention can be found in Ullmann's Encyclopedia of Industrial Chemistry, Vol. A28, pages 103 to 163, 1996, Karsten, Lackrohstoff-Tabellen, 9th Edition, Vincentz Verlag, Chapter 33, pages 558–569 (1992), Römpp Lexikon "Lacke und Druckfarben", Georg Thieme Verlag, pages 157–162 (1998) and "The Printing Ink Manual", Fourth Edition, VNR International, Chapter 4, Section VII "Waxes", pages 249–257 (1988), all of which are incorporated herein by reference. Such waxes that are conventionally used to produce the finished products into which the beaded black is to be incorporated can preferably be used. The process also permits the homogeneous application of smaller amounts of wax and hence an improved effect in comparison to the use of equal amounts of pure wax. The proportion of wax incorporated into the finished product by means of the beaded black can generally be kept lower than would be the case with conventional processing because of its homogeneous distribution on the surface of the carbon black due to its dilution with the pelletizing oil. In this way the beaded black places minimal restrictions on the amount of wax contained in the finished product. A paraffin wax or a blend of refined hydrocarbon waxes can preferably be used as the wax.

Resins, preferably bituminous solutions, can also be used as pelletizing additives. An overview of suitable resins according to the invention can be found in Karsten, Lackrohstoff-Tabellen, 9th Edition, Vincentz Verlag, Chapters 1–32, pages 55–558 (1992), Römpp Lexikon "Lacke und Druckfarben", Georg Thieme Verlag, pages 157–162 (1998), "The Printing Ink Manual", Fourth Edition, VNR International, Chapter 4, Section IV "Resins", pages 192–224 (1988) and Printing Materials: Science and Technology, Bob Thompson Pira International, Vehicles, Oils, Resins, pages 338–340 (1998). These references are relied on and incorporated herein.

Mixtures of waxes, mixtures of resins and mixtures of waxes and resins can also be used as pelletizing additives.

A mineral oil, preferably naphthenic oil, can be used as the synthetic oil. An overview of suitable synthetic oils according to the invention can be found in Karsten, Lackrohstoff-Tabellen, 9th Edition, Vincentz Verlag, Chapter 37, pages 601–620 (1992), Römpp Lexikon "Lacke und Druckfarben", Georg Thieme Verlag, pages 157–162 (1998), "The Printing Ink Manual", Fourth Edition, VNR International, Chapter 4, Section III "Oils", pages 188–191 and Section V "Solvents", pages 225–243 (1988) and Printing Materials: Science and Technology, Bob Thompson Pira International, Vehicles, Oils, Resins, page 342 (1998). These references are incorporated herein by reference.

The total bead hardness of the beaded black according to the invention can be greater than 6 kg, preferably greater than 7 kg. The bead strength of the 0.5 mm–0.71 mm bead fraction can be greater than 70 KPa, preferably greater than 80 KPa. The bead strength of the 0.71 mm–1.00 mm bead fraction can be greater than 60 KPa, preferably greater than 68 KPa. The average individual bead hardness of the 0.71–1.00 mm bead fraction can be greater than 3 g.

Lamp black, channel black, gas black or furnace black can be used as starting black. Starting blacks having a DBP adsorption of between 40 and 250 ml/100 g and a nitrogen surface area of 5 to 500 m2/g can preferably be used. Corax N 330, Printex 3, Printex 30, Printex 300 and Printex 35 from Degussa-Hüls can particularly preferably be used as starting blacks.

The invention also provides a process for producing a beaded black according to the invention, characterised in that powdered carbon black and the oil/pelletizing additive mixture are mixed together. Mixing can be performed in a pelletizing machine, a continuous or discontinuous mixer or a mill, for example a compressed air mill or hammer mill.

BRIEF DESCRIPTION OF DRAWINGS

The invention will be further understood with reference to the following drawings.

DETAILED DESCRIPTION OF INVENTION

Figure 1:
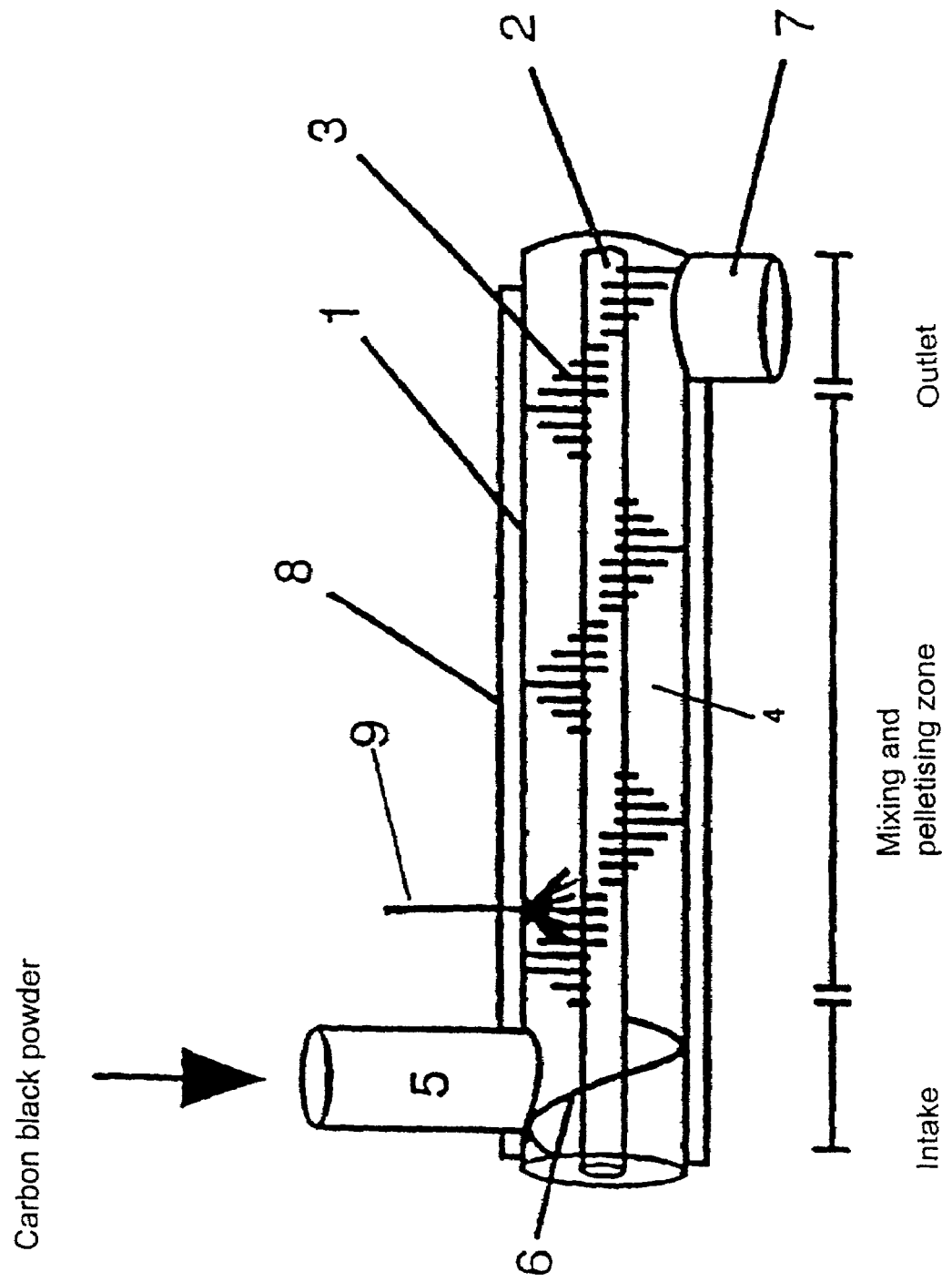
FIG. 1 is a schematic representation of a pelletizer with pin shaft for production of the beaded black according to the invention.

In one embodiment the beaded black according to the invention can be produced in a pelletizing machine with a pin shaft, whereby the pelletizing machine displays an intake zone, a mixing and pelletizing zone and an outlet zone, by feeding powdered carbon black into the intake zone of the pelletizing machine, continuously removing the carbon black from the outlet of the pelletizing machine and spraying the oil/pelletizing additive mixture onto the starting black ahead of the pelletizing machine or in the first third of the pelletizing machine whilst it is still in powder form.

The pelletizing machine can be heatable.

A device according to DE 196 23 198 can be used according to the invention. The entire disclosure of which document is incorporated herein by reference.

To produce the beaded black according to the invention, the speed of the pin shaft can be adjusted such that the peripheral speed of the pin tips assumes values of between 1 and 30 m/s. The average retention time of the carbon black in the pelletizing machine can be adjusted to a value between 20 and 600 seconds, preferably between 20 and 180 seconds.

The manner in which the oil/pelletizing additive mixture is added has a great influence on the quality of the finished beaded black. The desired bead hardness with a content of less than 10 wt. % of pelletizing additive in the beaded black can be achieved if the oil/pelletizing additive mixture is sprayed very finely over the powdered starting black with an average droplet size of less than 50 µm.

The oil/pelletizing additive mixture can be sprayed by first melting it by heating it to a temperature between the melting temperature and the decomposition temperature of the pelletizing additive and then feeding it to a spray nozzle. Spraying the oil/pelletizing additive mixture through a two-fluid nozzle can be suitable for the purposes of the invention. Average droplet sizes of around 20 µm can be obtained by spraying the oil/pelletizing additive mixture by means of compressed air at 6 bar. The mixture can also be sprayed by means of pressure atomisation.

In addition to the manner in which the oil/pelletizing additive is sprayed, the location in which it is sprayed also has a substantial influence on the quality of the beaded black that is formed. The pelletizing machine for use according to the invention can consist of a horizontal, fixed pipe (stator) in which a pin shaft (rotor) rotates. The pelletizing machine has an intake zone in which the powdered starting black is fed into the pelletizing machine. This zone includes a feed screw which imparts an axial motion component to the supply of carbon black. Adjacent to the intake zone is the actual mixing and pelletizing zone, in which the carbon black is first coated with the oil/pelletizing additive mixture and can then agglomerate at the inner wall of the stator due to the mechanical action of the rotating pins and to the rolling motion.

The size of the individual zones of the pelletizing machine can vary according to the design of the pelletizing machine. In all cases the intake and outlet zone should be kept as small as possible to maximize the mixing and pelletizing zone. In order to obtain as homogeneous as possible a distribution of the oil/pelletizing additive mixture across the entire cross-section of the carbon black beads, the oil/pelletizing additive mixture must be sprayed onto the carbon black ahead of the pelletizing machine or in the first third of the pelletizing machine. Introducing the oil/pelletizing additive mixture at a later stage of bead formation leads to an inhomogeneous structure in the carbon black beads and hence to a reduced bead hardness.

A further improvement in the homogeneity with which the oil/pelletizing additive mixture is incorporated into the carbon black can be obtained if several spray nozzles arranged on one level perpendicular to the pin shaft around the perimeter of the stator are used for spraying. The number of nozzles can conveniently be limited to one to six. The nozzles can be arranged on one level perpendicular to the pin shaft in order to ensure a good homogeneity of incorporation.

The oil and pelletizing additive can be incorporated at different agglomeration stages by means of an axial adjustment.

A feed screw can be used to feed the powdered carbon black into the pelletizing zone of the pelletizing machine. The carbon black throughput or output of the pelletizing machine is therefore equal to the delivery rate of the screw and can thus be adjusted between broad limits. The capacity and retention time can be increased by raising the outlet zone in relation to the intake zone. The resulting angle between the axis of the pelletizing machine and the horizontal can be adjusted between around 0 and 15°.

The capacity and retention time can also be influenced by the speed of the pin shaft. If the supply of carbon black remains uniform (constant carbon black throughput), the capacity and retention time reduce proportionally to each other as the speed increases.

The preferred retention times for production of the carbon black according to the invention can lie in the range between 20 and 180 seconds. Below 20 seconds the agglomeration process can be more or less incomplete. In this case the unit acts as a mixer but nevertheless delivers a certain proportion of bead seeds, which support pelletization in the pelletizing drum. Retention times above 600 seconds are usually possible only at low carbon black throughput rates because of the upper limit to the capacity.

Agglomeration can conveniently be initiated by incorporating beaded black into the powdered black as agglomeration seeds (also referred to below as inoculum). Beaded black in the same grades of carbon black that are to be pelletized can preferably be used. Depending on the bead properties of the carbon black, up to 60 wt. % of beaded black can be added to it. The beaded black can preferably be added to the powdered black in a quantity of 5 to 40 wt. %. In the case of readily pelletizing carbon black grades, the addition of beaded black can be omitted altogether or can be terminated shortly before the start of pelletization.

A further improvement in pelletization can be achieved if the powdered black is compressed to bulk densities of between 150 and 350 g/l before it is fed into the pelletizing machine. Precompression can be performed by known means, using vacuum filter rolls for example.

The beaded black according to the invention can advantageously be used as a filler and/or pigment in rubber and plastic articles and as a pigment for the production of printing inks.

As a consequence of its excellent bead hardness it is characterised by good transportation and metering properties and yet can be readily dispersed.

The improved bead hardness and bead strength can be achieved whilst retaining the good dispersibility of the pellets. In attrition mill dispersion the carbon black according to the invention displays a dispersibility that is just as good as that of the powdered black and it also has the material handling advantages of a beaded black. The beaded blacks according to the invention have a higher abrasion resistance in printing inks than comparable carbon blacks pelletized using oil or wax.

According to FIG. 1 the beaded black according to the invention can be produced with a pelletizing machine. FIG. 1 shows a schematic view of the design of such a pelletizing machine. The pelletizing machine consists of a horizontal fixed pipe 1, the stator, and, positioned axially within it, a rotating pin shaft 2 with a helical arrangement of pins. The bead chamber 4 of the pelletizing machine is located between the pin shaft 2 and the stator 1. The powdered black is fed into the pelletizer at the intake 5. On the pin shaft in the intake zone there is a feed screw 6, which conveys the powdered black in an axial direction towards the outlet 7. The stator 1 has a twin-wall construction and allows the temperature of the stator wall to be controlled by means of a liquid or steam 8. In the first third of the pelletizing zone of the stator there are access holes through which spray nozzles 9 for adding the oil/pelletizing additive mixture can be introduced.

Figure 2:
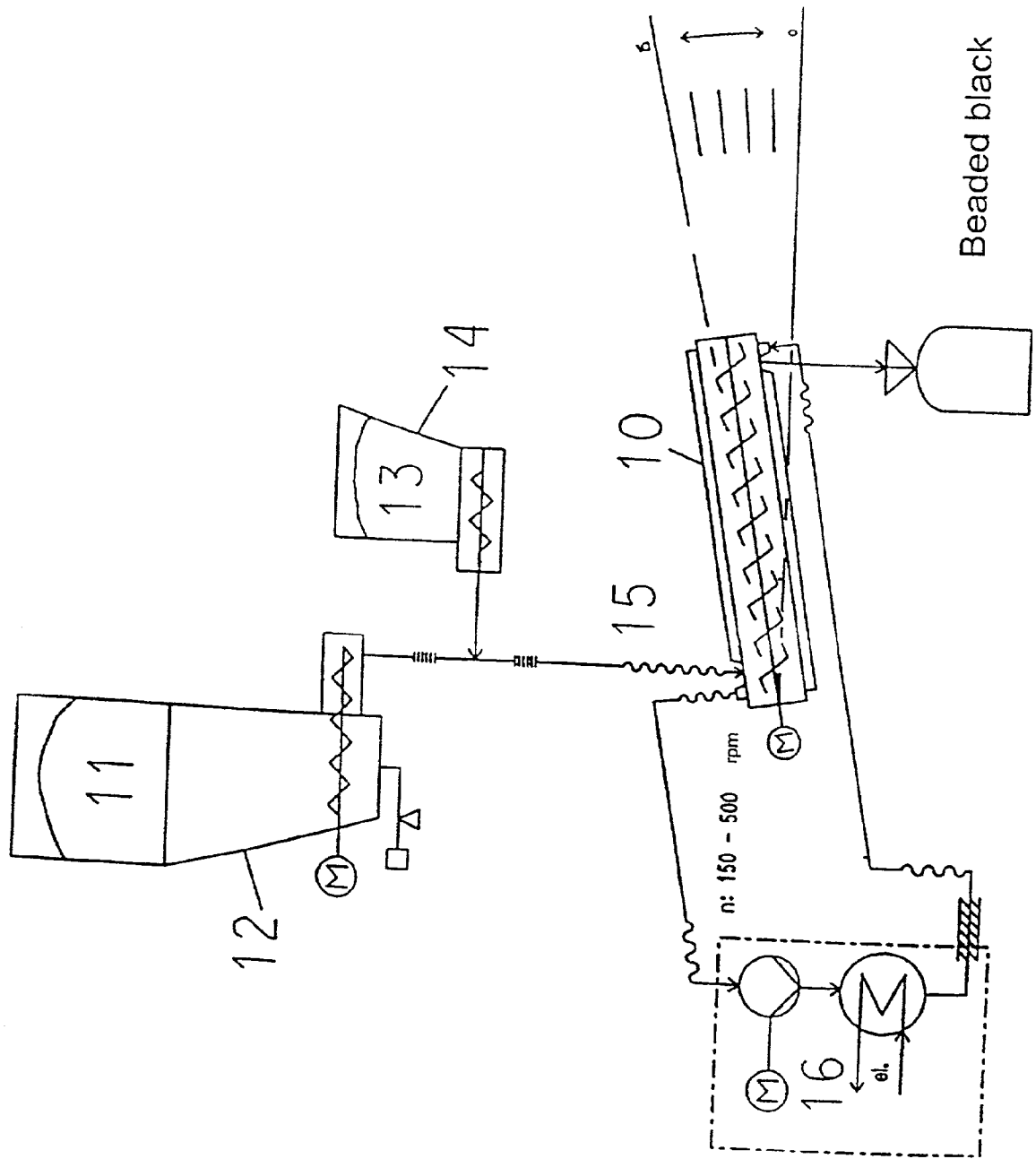
FIG. 2 is a process flow chart for production of the beaded black according to the invention.

FIG. 2 illustrates the process flow chart for the production of the beaded black according to the invention. The axis of the pelletizing machine 10 can be inclined at an angle of 0 to 15° to the horizontal in order to adjust the retention time. To this end the outlet of the pelletizing machine is raised correspondingly in relation to the intake. Powdered carbon black 11 and optionally inoculum 13 are fed to the intake 15 of the pelletizing machine 10 or the pelletizing drum from the collection vessels 12 and 14. The stator in the pelletizing machine is adjusted to a desired temperature by means of the thermostat 16.

EXAMPLES

A Printex 30 powder (Table 1) is used as the starting carbon black.

TABLE 1

| Printex 30 P | Unit | |
| --- | --- | --- |
| Bulk density (ASTM D 1513-99) | g/l | 174 |
| Volatile content (DIN 53552) | % | 1.3 |
| Iodine value (DIN 53582) | mg/g | 86 |
| CTAB (ASTM D-3765) | $m^2/g$ | 74 |
| DBP (DIN 53601) | ml/100 g | 105 |

The test settings are set out in Table 2.

TABLE 2

| | Oil pelletizing Comparative example 1 | Wax pelletizing Comparative example 2 | Oil/wax pelletizing Example 3 |
| --- | --- | --- | --- |
| Fluffy carbon black | | | |
| Grade | Printex 30 P | Printex 30 P | Printex 30 P |
| Throughput [kg/h] | 40 | 40 | 40 |
| Inoculum | | | |
| Grade | Printer 30, oil-pelletized | Printex 30, wax-pelletized | Printex 30, oil/wax-pell. |
| Quantity [kg/h] | 2 | 2 | 2 |
| Additive | | | |
| Content of wax/oil [%] | 0/6 | 3/0 | 3/6 |
| Grade | Gravex oil | Protector G35 | Gravex oil/Protector G35 |
| Quantity (additive) [kg/h] | 2.4 | 1.2 | 3.6 |
| Metering Station | | | |
| Pump lift [mm] | 4.4 | 2.6 | 6.9 |
| Nozzle type | Two-fluid | Two-fluid | Two-fluid |
| Nozzle [mm] | 0.8 | 0.8 | 0.8 |

TABLE 2-continued

| | Oil pelletizing Comparative example 1 | Wax pelletizing Comparative example 2 | Oil/wax pelletizing Example 3 |
| --- | --- | --- | --- |
| Throughput of air through nozzle [$Nm^3/h$] | 1.5 | 1.5 | 1.5 |
| Spray position [cm] from centre of intake 5 | 80 | 80 | 80 |
| Precompression | | | |
| Speed (roll) [rpm] | 3 | 3 | 3 |
| Vacuum [mbar] | 890 | 889 | 884 |
| Gap [mm] | 3 | 3 | 3 |
| Pelletizing machine | | | |
| Speed [rpm] | 285 | 285 | 285 |
| Current consumption [A] | 18 | 18 | 18 |
| Angle of inclination [°] | 10 | 10 | 10 |
| Jacket temperature [° C.] | 110 | 110 | 110 |
| Retention time [s] | 76 | 76 | 76 |
| Peripheral speed [m/s] | 2.98 | 2.98 | 2.98 |
| Bulk density [g/l] | 276 | 260 | 284 |
| Post-pelletization | | | |
| Apparatus | Pelletizing drum | Pelletizing drum | Pelletizing drum |
| Drum speed [rpm] | 20 | 20 | 20 |
| Drum diameter [mm] | 400 | 400 | 400 |
| Temperature [° C.] | 70 | 70 | 70 |
| Time [h] | 2 | 2 | 2 |
| Bulk density [g/l] | 288 | 290 | 300 |

The analytical results are set out in Table 3.

TABLE 3

| Analytical data | Oil pelletizing Comparative example 1 | Wax pelletizing Comparative example 2 | Oil/Wax pelletizing Example 3 | Printex 30 P Starting black |
| --- | --- | --- | --- | --- |
| Total bead hardness [kg] (post-pelletization) | 6 | 5 | 9 | — |
| Individual bead hardness | | | | |
| 0.5–0.71 mm | | | | |
| Mean [g] | 1.81 | 1.27 | 2.44 | — |
| Standard dev. [g] | 0.71 | 0.42 | 0.87 | — |
| 5 hardest [g] beads | 2.61 | 1.81 | 3.52 | — |
| Min. hardness [g] | 0.61 | 0.6 | 0.94 | — |
| Max. hardness [g] | 2.82 | 2.06 | 4.49 | — |
| Strength [kPa] | 60.89 | 46.46 | 89.2 | — |
| 0.71–1.00 mm | | | | |
| Mean [g] | 2.60 | 2.93 | 4.31 | — |
| Standard dev. [g] | 1.09 | 1.08 | 1.10 | — |
| 5 hardest [g] beads | 3.86 | 4.22 | 5.58 | — |
| Min. hardness [g] | 0.67 | 0.96 | 1.92 | — |
| Max. hardness [g] | 4.37 | 4.52 | 6.38 | — |
| Strength [kPa] | 47.59 | 46.37 | 75.26 | — |

TABLE 3-continued

| Analytical data | Oil pelletizing Comparative example 1 | Wax pelletizing Comparative example 2 | Oil/Wax pelletizing Example 3 | Printex 30 P Starting black |
|---|---|---|---|---|
| 1.0–1.4 mm | | | | |
| Mean [g] | 4.44 | 4.89 | 6.95 | — |
| Standard dev. [g] | 1.77 | 1.47 | 2.91 | — |
| 5 hardest beads [g] | 6.77 | 6.91 | 10.64 | — |
| Min. hardness [g] | 2.17 | 3.25 | 2.60 | — |
| Max. hardness [g] | 7.91 | 8.74 | 13.83 | — |
| Strength [kPa] | 41.66 | 49.64 | 67.2 | — |
| Predispersion 45' [µm] | 180 | 180 | 180 | 50 |
| Attrition mill dispersion 15' [µm] | 10 | 15 | 8 | 8 |
| Attrition mill dispersion 30' [µm] | <5 | <5 | <5 | <5 |
| Flow plate 90° 10' Flowability of printing ink | 130 | 129 | 170 | 99 |

Determining the Dispersibility of Oil-pelletized Carbon Blacks (Predispersion)

Equipment and Reagents:
  Dispermat high-speed mixer from Getzmann with a maximum speed of 20,000 rpm;
  High-speed mixer disc as toothed disc with a diameter of 25 mm;
  Steel cylinder as dispersion vessel with the following dimensions: d=55 mm, H=200 mm;
  Grindometer according to DIN 53 203
  Bituminous solution 169 from Haltermann,
  Gravex 942 from Shell Method
  Composition and preparation of the test varnish
  The following components are weighed into a casserole and homogenised:
    500.0 g bituminous solution 169
    500.0 g Gravex 942
  In order to check a newly prepared test varnish, reference is made to a reference sample of carbon black with a known dispersion curve.
  Performing the dispersion test
  The following components are weighed into the dispersion vessel:
    20.0 g carbon black
    80.0 g varnish
  The carbon black is carefully incorporated into the binder and wetted by stirring slowly. The dispersion test then follows without cooling at a mixer disc speed of 15,300 rpm=approx. 20 m/s in dispersion stages of 15 min. After each dispersion stage a small sample is taken and tested with the grindometer to check the distribution state reached by the carbon black. The total dispersion time is 45 min.

Results:
  The grindometer values measured after the individual dispersion stages are recorded as the result in order to be able to plot the dispersion curve. The grindometer value measured after a dispersion time of 45 min is taken as the measure of the dispersibility.

Determining the Printing Efficiency of Carbon Blacks in a Newspaper Ink (Attrition Mill Dispersion)
  Laboratory balance, weighing range 0.1–5500.0 g,
  High-speed laboratory mixer, e.g. Pendraulik, diameter of toothed disc 60 mm,
  Attrition mill, which should meet the following requirements:
  Stirrer with 3 eccentric annular elements, each offset by 120°;
  Stirrer speed: 2800 rpm;
  Millbase vessel:→overall capacity 500 ml, diameter 90 mm→effective capacity 300 ml
  Steel balls as grinding medium with a diameter of 3 mm; amount of steel balls required: 1,250 g;
  Grindometer according to DIN 53 203;
  Macbeth RD 918 densitometer,
  Newsprint 52 g/m2,
  280 µl high-speed screen from Drekopf,
  Albertol KP 172, phenol-modified colophony resin, Hoechst AG,
  Albertol KP 111, phenol-modified colophony resin, Hoechst AG,
  Gilsonite EWC 7214, asphalt resin, Worlee,
  Gravex 917, mineral oil, Shell Method
  Composition of the rotary offset varnish
  The following components are weighed into a casserole:

| | |
|---|---|
| 120 g | Albertol KP 172 |
| 120 g | Albertol KP 111 |
| 160 g | Gilsonite |
| 600 g | Gravex |
| 1000 g | |

The liquid component Gravex is conveniently measured out first. This is followed by the addition of the solid resins Albertol KP 172, Albertol KP 111 and Gilsonite, which are dissolved at 170° C. while being stirred. The mineral oil lost due to evaporation is made up. The finished varnish is passed through the screen (280µ). The varnish is ready for use once it has cooled.
  Preparing the printing ink
  The composition of the printing ink is as follows:

| | |
|---|---|
| 48.0 g | carbon black |
| 201.0 g | varnish |
| 51.0 g | Gravex |
| 300.0 g | |

The varnish and Gravex are homogenized. The carbon black is added in portions. Predispersion is performed for 10 min at 4000 rpm using the high-speed mixer. Dispersion is performed in the attrition mill without cooling in dispersion stages of 15 min each. After each dispersion stage a small sample is taken in order to determine the distribution state by means of the grindometer. Dispersion is ended as soon as a grindometer value of <5µ is measured. The required dispersion time is recorded.

Determining the Flow Behaviour of a Printing Ink Using the Flow Plate
  The carbon black to be tested is processed to form a printing ink similar to that used in industry.
  A metered amount of printing ink is applied to the glass plate and the glass plate is set up in a vertical position (90°).

After a predetermined time the distance over which the printing ink has run is measured in mm. This can be used as an indication of the flowability of a printing ink.

The total bead hardness to ASTM D 1937-98 and the individual bead hardness to ASTM D 5230-99 are measured.

The beaded black according to the invention (example 3) displays advantages over the oil-pelletized carbon blacks (comparative example 1) and the wax-pelletized carbon blacks (comparative example 2). The total bead hardness, the individual bead hardness and the bead strength of the 0.5 mm–0.71 mm and 0.71 mm–1.00 mm bead fractions of the beaded blacks according to the invention are clearly increased.

The improvement in bead hardnesses and bead strengths in comparison to comparative examples 1 and 2 can be achieved whilst retaining the good dispersibility of the pellets.

Dispersibility in attrition mill dispersion and flow behaviour are improved in comparison to the oil-pelletized and wax-pelletized reference blacks.

In attrition mill dispersion the carbon black according to the invention displays a dispersibility that is just as good as the powdered black used and it also has the material handling advantages of a beaded black.

Improved dispersibilities are obtained with the oil/pelletizing additive carbon blacks having the same or increased bead hardness in comparison to the prior art carbon blacks.

| Granvex oil | Shell AG |
|---|---|
| | Highly refined mineral oil |
| Protector G35 | Paramelt B.V. |
| | Blend of refined hydrocarbon waxes |

Further variations and modifications of the foregoing will be apparent to those skilled in the art and are intended to be encompassed by the claims appended hereto.

German priority application 100 62 942.3 is relied on and incorporated herein by reference.

We claim:

1. Beaded black, comprising carbon black and at least one pelletizing additive which is a wax or resin and at least one synthetic oil, wherein said at least one pelletizing agent and said at least one synthetic oil are incorporated into said carbon black in a homogeneous distribution.

2. The beaded black according to claim 1, wherein the pelletizing additive content is 0.1 to less than 10 wt. % and the oil content is 1 to 12 wt. %, relative to its total weight.

3. A beaded black according to claim 1, wherein the starting carbon black displays a DBP adsorption of between 40 and 250 ml/100 g and a nitrogen surface area of 5 to 500 m2/g.

4. The beaded black according to claim 1, wherein the pelletizing additive is a mixture of wax, mixture of resin or a mixture of wax and resin.

5. The beaded black according to claim 1, wherein the synthetic oil is a mineral oil.

6. A process for the production of a beaded black, comprising mixing together powdered carbon black and an oil/pelletizing additive mixture of at least one pelletizing additive which is a wax or resin and at least one synthetic oil,
spraying the oil/pelletizing additive mixture onto starting black ahead of a pelletizing machine or in the first third of the pelletizing machine while said starting black is still in powder form in a pelletizing machine with a pin shaft, said pelletizing machine having an intake zone, a mixing and pelletizing zone and an outlet zone, feeding powdered carbon black into the intake zone of the pelletizing machine and continuously removing the carbon black from the outlet zone of the pelletizing machine.

7. The process according to claim 6, wherein the oil/pelletizing additive mixture is sprayed over the starting carbon black while it is still in powder form by 1 to 6 nozzles, whereby the nozzles are arranged on one level perpendicular to the axis of the pin shaft.

8. The process according to claim 6, wherein the retention time of the carbon black in the pelletizing mixture is from 20 to 600 seconds.

9. The process according to claim 6, wherein up to 60 wt. % of beaded black in the same grades of carbon black is added to the powdered carbon black as an inoculum.

10. The process according to claim 6, wherein the powdered carbon black is precompressed to a bulk density of 150 to 350 g/l before pelletization.

11. A rubber or plastic article containing the beaded black according to claim 1 as a filler and/or pigment.

12. A printing ink containing the beaded black according to claim 1 as a pigment.

13. The beaded black according to claim 1 which has a total bead hardness greater than 6 kg.

14. The beaded black according to claim 1 which has a total bead hardness greater than 7 kg.

15. The beaded black according to claim 1 which has a bead strength of the bead fraction of 0.5 mm–0.71 mm greater than 7 KPa.

16. The beaded black according to claim 1 which has a bead strength of the bead fraction of 0.5 mm–0.71 mm greater than 80 KPa.

17. The beaded black according to claim 1 wherein the bead strength of the of 0.71 mm–1.00 mm bead fraction is greater than 60 Kpa.

18. The beaded black according to claim 1 wherein the bead strength of the of 0.71 mm–1.00 mm bead fraction is greater than 68 Kpa.

19. The beaded black according to claim 1 wherein the carbon black has a DBP adsorption of between 40 and 250 ml/100 g and a nitrogen surface area of 5 to 500 $m^2$/g.

20. The process according to claim 6 wherein mixing takes place in a pelletizing machine with a pin shaft having pin tips wherein the speed of the pin shaft is such that the peripheral speed of the pin tips is between 1 and 30 m/s and the retention time of the carbon black is between 20 and 600 seconds.

21. The process according to claim 6 wherein the retention time is 20 to 180 seconds.

22. The process according to claim 6, wherein the oil/pellitizing additive mixture is sprayed very finely over powdered starting carbon black with an average droplet size of less than 50 μm.

23. The process according to claim 6 wherein the oil/pelletizing additive mixture is first melted by heating it to a temperature between the melting temperature and the decomposition temperature of the pelletizing additive and then feeding molten pelletizing additive to a spray nozzle.

24. The process according to claim 6 wherein the spraying takes place through two fluid nozzle wherein the average droplet size is about 20 μm.

25. The method according to claim 6 wherein the oil/pelletizing additive mixture is sprayed on to the carbon black upstream of the pelletizing machine or in a first third of the pelletizing machine.

26. A method to improve the abrasion resistance of a printing ink comprising adding to said printing ink the beaded black according to claim 1.

27. A beaded black comprising carbon black, wax and a synthetic oil.

* * * * *